Jan. 4, 1966 J. R. PREZIOSI ETAL 3,227,030
SPRING PIN
Filed June 10, 1963
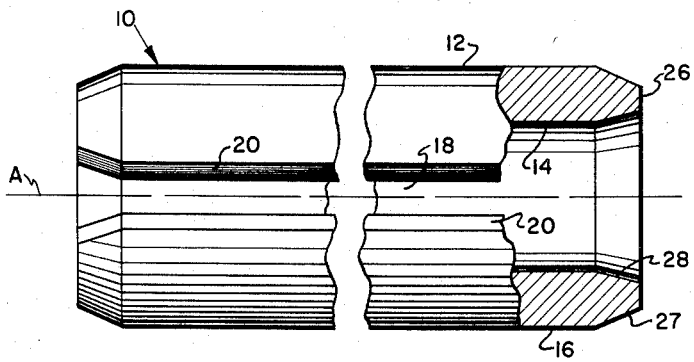
FIG. 1
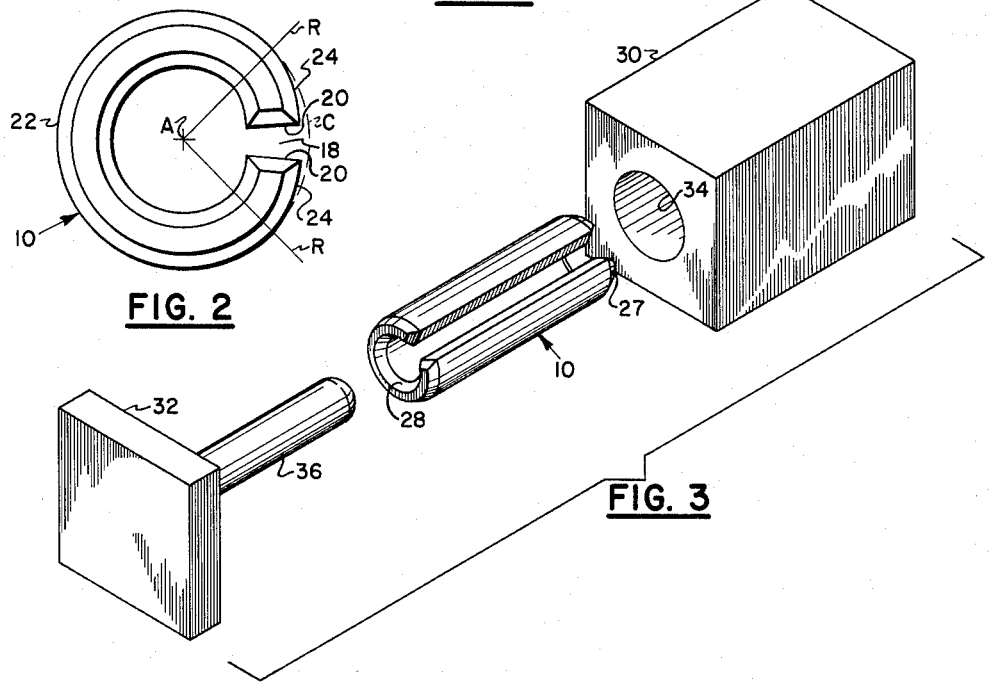
FIG. 2
FIG. 3
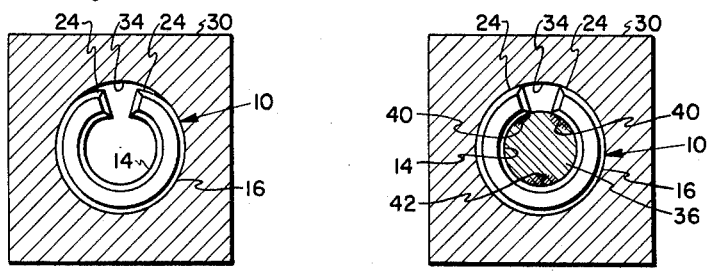
FIG. 4 FIG. 5
INVENTORS
JOSEPH R. PREZIOSI
JOSEPH L. PRYOR
BY
*Arthur Jacob*
ATTORNEY

United States Patent Office 3,227,030
Patented Jan. 4, 1966

3,227,030
SPRING PIN
Joseph R. Preziosi, Newark, and Joseph L. Pryor, Carteret, N.J., assignors to Elastic Stop Nut Corporation of America, Union, N.J., a corporation of New Jersey
Filed June 10, 1963, Ser. No. 286,843
1 Claim. (Cl. 85—36)

The present invention relates generally to fastening devices and pertains more specifically to resilient spring pins having simultaneous internal and external retention capabilities.

Spring pins in the form of longitudinally split sleeves of elastic metal are employed as fasteners by being driven into or through holes placed in parts to be connected in an assembly, the holes being smaller in diameter than the pins. Because the diameter of the pin is slightly larger than that of the hole which receives it, the pin, when installed, is elastically laterally contracted and a continuous frictional gripping force is established against the surrounding walls of the hole by virtue of the elastic reaction of the pin material to retain the pin within the hole and maintain the desired firm connection between the parts.

In certain assemblies it is not feasible to provide holes in each of the parts to be connected and in such assemblies a first part may be provided with a projection adapted to enter a hole in a second part which is to be connected to the first part. It has been found that a spring pin can be employed to fasten such parts together in an assembly if the spring pin is capable of retaining the projection of the first part within the sleeve of the pin and the pin itself is capable of being simultaneously retained within the hole of the second part, both retentive capacities arising out of an elastic deflection of the sleeve material.

It is therefore a primary object of the invention to provide a spring pin having both internal and external retention capabilities which may be employed either individually or simultaneously in assembling a wide variety of parts.

Another object of the invention is to provide a spring pin which requires reduced insertion forces as compared to conventional spring pins, without a significant reduction in retention capabilities, and attains simultaneous internal and external retention capabilities along the entire length of the pin.

A further object of the invention is to provide a spring pin having a construction which accomplishes simultaneous internal and external retention, and is capable of being readily fabricated in large numbers utilizing conventional machinery and manufacturing techniques.

Briefly, the invention is described as a spring pin having simultaneous internal and external retention capabilities provided by a unitary sleeve of resilient material having a wall of uniform thickness and a predetermined length with a longitudinal central axis. A longitudinal slit splits the sleeve along the entire length thereof and a portion of the sleeve wall adjacent the slit is displaced inwardly toward the central axis relative to the remainder of the sleeve. The inwardly displaced portion may extend along the entire sleeve length.

The novel construction of the invention, as well as additional objects and advantages thereof, will be more fully understood in the following detailed description of a preferred embodiment of the invention illustrated in the accompanying drawings in which:

FIGURE 1 is a plan view of a spring pin constructed in accordance with the invention;

FIGURE 2 is an end view of the spring pin of FIGURE 1;

FIGURE 3 is an exploded perspective view illustrating the employment of the spring pin of FIGURE 1, reduced in scale, in an assembly;

FIGURE 4 is a partially sectioned end view illustrating the external retention capability of the spring pin of FIGURE 1, reduced in scale; and FIGURE 5 is a partially sectioned end view illustrating the simultaneous internal and external retention capabilities of the spring pin of FIGURE 1, reduced in scale.

Referring now to the drawings, and more particularly to FIGURES 1 and 2, a spring pin of the invention is generally designated at 10 and is constructed in the form of a sleeve 12 of resilient material, the resilient material being an elastic metal such as a high carbon steel or an alloy steel having suitable elastic properties or one of a variety of nonferrous metal alloys such as, for example, spring brass or bronze, beryllium copper and the like.

The sleeve 12 is shown in the form of a cylindrical tube of uniform wall thickness having an internal surface 14 and an external surface 16 and a longitudinal slit 18 splitting the sleeve along the entire length of the pin to provide confronting edges 20 communicating with the internal and external surfaces from end to end of the sleeve. As in conventional spring pins, the slit 18 allows the sleeve to be laterally contracted by elastic compression of the sleeve to move edges 20 toward one another and decrease the gap therebetween so that the pin may be inserted into a hole having a smaller diameter than the normal diameter of sleeve 12 to establish a frictional gripping force between at least a portion of the external surface 16 and the walls of the hole for assembling purposes as will be explained more fully hereinafter.

In order to accomplish an internal retention capability within the pin 10 without significantly decreasing the external retention capability and without providing a pin construction which might require a wide departure from fabrication techniques and machinery currently employed in the manufacture of conventional spring pins, portions of the sleeve wall adjacent the slit 18 are displaced inwardly relative to the remainder of the sleeve. As best seen in FIGURE 2, a major portion 22 of the perimeter of sleeve 12 is in the form of an arc of a circle, which arc lies within the reflex angle between lines R which radiate from longitudinal central axis A of the sleeve; however, the remainder of the perimeter, or minor portion, which lies outside the aforesaid reflex angle, deviates inwardly from the circle upon which major portion 22 lies, which circle is continued by dotted line C for illustrative purposes, portions 24 of the sleeve wall being displaced inwardly toward central axis A relative to the portion 22 such that distances measured in planes perpendicular to the central axis (i.e., the plane of the paper in FIGURE 2) from the axis to points lying on the internal surface of portions 24 decrease with the increasing proximity of such points to edges 20. In the embodiment shown, the reflex angle is approximately 270 degrees so that the major portion 22 of the perimeter of the sleeve is somewhat greater than three times the minor portion. Since portions 24 are shown extending over the entire length of the pin 10, current manufacturing processes, such as the method described in U.S. Patent No. 2,766,516, are readily adapted to the fabrication of spring pin 10. Each end 26 of the sleeve is externally chamfered at 27 to facilitate insertion of the pin into a hole and internally chamfered at 28 to ease the insertion of a member into the pin for assembling parts in a manner which will now be described.

Referring now to FIGURE 3 a block-like element 30 is shown in the process of being assembled with a relatively thin plate-like part 32 through the employment of a spring pin 10. The spring pin 10 is inserted into an opening in block 30, illustrated in the form of hole 34 which has a diameter slightly smaller than the normal diameter of arcuate portion 22 of external surface 16 of the pin. Such insertion, facilitated by chamfer 27, causes the pin to contract laterally and the elastic nature of the material of sleeve 12 establishes a reaction force so that portion 22 frictionally grips the wall of hole 34 to secure the pin therein as shown in FIGURE 4. Since portions 24 of the sleeve wall do not contact the wall of hole 34, the frictional gripping surface of pin 10 of the invention is somewhat reduced when compared to conventional spring pins of comparable dimensions; however, major portion 22 is significantly greater than the remaining minor portion of the perimeter of sleeve 12 and the actual holding power of the pin 10 is not reduced to any significant degree. Insertion of pin 10 into hole 34 is further eased by virtue of the fact that the sharp edges formed at the intersection of slit 18 with external surface 16 do not contact the walls of hole 34 during insertion so that the tendency toward scoring, gouging or marring of the hole wall surfaces by insertion of the pin is substantially reduced with a consequent reduction of the force required for insertion. Such reduced force is significant in that insertion may be accomplished without excessive deformation of the end of the pin where the insertion force is applied, which deformation could interfere with the insertion of the pin into the hole as well as with the insertion of a member into the pin as will now be described.

Because plate 32 is relatively thin, it is not feasible to place a hole therein for the reception of a portion of pin 10 to connect plate 32 to block 30 in a manner similar to the way in which conventional spring pins are employed. Thus, plate 32 is provided with an integral projection, shown in the form of cylindrical member 36 which has a diameter closely approximating, though somewhat smaller than, the diameter of the arcuate portion of internal surface 14 of sleeve 12 and a length at least as great as the length of pin 10. Member 36 may be inserted into pin 10, which has been secured within hole 34 as explained above, and advanced until member 36 engages sleeve 12 internally along the entire length of the sleeve and plate 32 abuts block 30. Such insertion, facilitated by chamfer 28, causes a lateral expansion of the pin by member 36, as seen in FIGURE 5, by virtue of the deflection of portions 24 radially outwardly. The elastic properties of the sleeve material cause each portion 24 to exert a reaction force upon member 36 in the vicinity of shaded areas 40, thus forcing member 36 against internal surface 14 in the vicinity of shaded area 42 to establish a firm frictional grip upon the member 36 and secure the member within the sleeve 12. Since the gripping forces extend axially along the entire length of the pin, a firm grip is assured. In addition, insertion of member 36 into the sleeve 12 will have the effect of increasing the frictional holding power of the external surface 16 within hole 34 since such insertion will tend to laterally expand the entire sleeve.

Thus it is seen that pin 10 exerts an internal retaining force upon member 36 concurrent with an external retaining force upon the wall of hole 34 to maintain plate 32 and block 30 in rigidly assembled relationship. It will be apparent, however, that since either the internal or the external retention capability may be utilized alone, any one spring pin construction of the invention may find a wide variety of applications in assemblies requiring external retention, internal retention or both external and internal retention.

It is to be understood that the above detailed description of a preferred embodiment of the invention is provided by way of example only and is not intended to restrict the invention. Various details of design and construction may be modified without departing from the true spirit and scope of the invention as set forth in the appended claim.

We claim:

A spring pin having simultaneous internal and external retention capabilities, said pin comprising a unitary sleeve of resilient material having a wall of uniform thickness and predetermined length with a longitudinal central axis, a longitudinal slit splitting said sleeve wall along said entire length defining longitudinal confronting uniformly spaced edges in said sleeve wall, said sleeve having a cylindrical section of predetermined diameter defining an outer cylindrical envelope for said pin, said section concentric with said central axis along said length over the major portion of the perimeter of said section, said edges being substantially equally displaced inwardly along said entire length toward said axis relative to said major portion to establish a minor portion of the said perimeter adjacent said edges from end to end of said sleeve projecting inwardly toward said axis, the displacement of said edges toward said axis being such that the distance measured in planes perpendicular to said axis from said axis to points on said sleeve wall decreases as said points approach said edges, no part of said pin lying outside said envelope, said pin being externally chamfered at least one end to ease insertion of said pin into an opening and internally chamfered at at least one end to ease insertion of a member into said pin, and said pin having a smooth external periphery and a generally cylindrical smooth internal surface.

References Cited by the Examiner

UNITED STATES PATENTS

| | | | |
|---|---|---|---|
| 2,244,975 | 6/1941 | Tinnerman | 85—5 |
| 2,931,412 | 4/1960 | Wing | 85—36 |
| 2,972,275 | 2/1961 | Baubles | 85—8.3 |

FOREIGN PATENTS

| | | |
|---|---|---|
| 559,858 | 7/1958 | Canada. |
| 1,237,045 | 6/1960 | France. |

EDWARD C. ALLEN, *Primary Examiner.*